United States Patent
Lapalu et al.

(10) Patent No.: US 7,918,930 B2
(45) Date of Patent: Apr. 5, 2011

(54) METHOD FOR PREPARING BITUMEN BASE

(75) Inventors: Laurence Lapalu, Villeurbanne (FR); Regis Vincent, Grigney (FR)

(73) Assignee: Total France, Puteaux (FR)

( * ) Notice: Subject to any disclaimer, the term of this patent is extended or adjusted under 35 U.S.C. 154(b) by 219 days.

(21) Appl. No.: 11/996,036

(22) PCT Filed: Jul. 28, 2006

(86) PCT No.: PCT/EP2006/064777
§ 371 (c)(1),
(2), (4) Date: Aug. 25, 2008

(87) PCT Pub. No.: WO2007/012665
PCT Pub. Date: Feb. 1, 2007

(65) Prior Publication Data
US 2008/0308007 A1    Dec. 18, 2008

(30) Foreign Application Priority Data
Jul. 28, 2005  (FR) ..................... 05 52366

(51) Int. Cl.
  *C08L 95/00*  (2006.01)
  *C10C 3/02*  (2006.01)
(52) U.S. Cl. ................ 106/273.1; 106/281.1; 106/284.4; 208/44
(58) Field of Classification Search ................ 106/273.1, 106/281.1, 284.4; 208/44
See application file for complete search history.

(56) References Cited

U.S. PATENT DOCUMENTS

| | | | |
|---|---|---|---|
| 4,440,886 A | 4/1984 | Kraus | |
| 5,326,798 A | 7/1994 | Danese | |
| 6,949,593 B2 * | 9/2005 | Heimerikx et al. | 524/68 |
| 7,247,664 B2 * | 7/2007 | Heimerikx et al. | 524/68 |
| 2002/0081924 A1 | 6/2002 | Fensel et al. | |
| 2004/0014846 A1 * | 1/2004 | Heimerikx et al. | 524/59 |

FOREIGN PATENT DOCUMENTS

| | | |
|---|---|---|
| EP | 0 040 319 A1 | 11/1981 |
| GB | 836543 | 6/1960 |
| WO | WO 02/26889 A1 | 4/2002 |

* cited by examiner

*Primary Examiner* — Helene Klemanski
(74) *Attorney, Agent, or Firm* — McDonnell Boehnen Hulbert & Berghoff LLP

(57) ABSTRACT

The invention concerns a method for preparing a bitumen base, including the following essential steps: a) introducing a bitumen in a container equipped with mixing means, and bringing the bitumen to a temperature of 120° C. to 300° C.; b) introducing at least one chemical blowing additive into the container, and mixing, said chemical blowing additive being of general formula Ar1-R—Ar2 (I) wherein Ar1 and Ar2 independently of each other represent a benzene ring or a system of condensed aromatic rings of 6 to 20 carbon atoms, substituted by at least one hydroxyl group, and R represents an optionally substituted divalent radical, whereof the main chain comprises 6 to 20 carbon atoms and at least one amide and/or ester group. The invention also concerns a bitumen base obtained by implementing said method, as well as the use of such bitumen bases in road surfacing and industrial applications.

14 Claims, 1 Drawing Sheet

METHOD FOR PREPARING BITUMEN BASE

FIELD OF THE INVENTION

The present invention relates to the field of the preparation of bitumen bases. More particularly, it relates to the preparation of a bitumen base having certain features of a blown bitumen, with the help of an organic additive, as opposed to blowing by injection of a gas such as air or ozone.

TECHNICAL CONTEXT

Blown bitumens are a particular family of bituminous bases available at the refinery, which are used because of their properties for the preparation of commercial products. Blown bitumens are manufactured in a blowing unit, by passing a flow of air and/or oxygen through a starting bituminous base. This operation can be carried out in the presence of an oxidation catalyst, for example phosphoric acid. Generally, the blowing is carried out at high temperatures, of the order of 200 to 300° C., for relatively long periods of time typically comprised between 30 minutes and 2 hours, continuously or in batches. The blowing period and temperature are set according to the intended properties for the blown bitumen and according to the grade of the starting bitumen.

The principal aim of blowing a bitumen is to reduce its thermal susceptibility, i.e. to increase the penetration index (or Pfeiffer number) of the blown bitumen compared with the starting bitumen. The blowing operation has the effect of hardening the treated bitumen by oxidation. A blown bitumen has a higher ring-and-ball softening point (RBSP) than that of the starting bitumen and a needle penetration ($P_{25}$) of the same order of magnitude as that of the starting bitumen.

For the record, the higher the needle penetration of a bitumen, the better its workability and the easier its use. Moreover, the risks of rutting at the service temperature of a given bitumen are less when the RBSP of the bitumen increases.

Blown bitumens were widely used in the 1970s as they have a higher RBSP than that of the starting bitumens, while still retaining a satisfactory needle penetration. Thus, the penetration index of blown bitumens is improved compared with that of the starting bitumens.

However, blown bitumens present a number of drawbacks, as a result of which they are used less than previously. Firstly, blown bitumens are more susceptible to ageing than starting bitumens.

Moreover, blown bitumens are generally more brittle in cold conditions than the starting bitumen. This can be explained by the fact that blowing has the effect of hardening the bitumen.

Another drawback of blown bitumens is that their adhesiveness to aggregate is sometimes inadequate: the production of bituminous asphalt mixes or other types of bitumen/aggregate combinations is therefore made more difficult.

Finally, as blown bitumens are hardened compared with the starting bitumen, their viscosity at a given temperature is greater than that of the starting bitumen. Also, to be able to easily use a blown bitumen, it is necessary to raise it to higher temperatures, which involves additional energy costs, the possible need for additional protection for operators, and the risk of emission of unpleasant fumes.

Moreover, as was emphasised above, the manufacture of blown bitumen requires a dedicated blowing unit.

International patent application WO 02/26889 A1 relates to a bitumen composition modified by an elastomeric polymer, for example an SBS, also containing an additive such as IRGANOX © MD-1024, IRGANOX © 1098, IRGANOX © 259 or NAUGARD XL-1.

The examples of implementation show a composition based on a grade 160/210 bitumen, an SBS elastomer, a filler (30% by weight) and IRGANOX © MD-1024. As these examples show, the penetration at 50° C. of these compositions reduces compared with that of a control composition example, IRGANOX © MD-1024. This means therefore that the compositions in question are harder at 50° C.

On the other hand, it is also established that the viscosity at 180° C. of the bitumen-polymer compositions in question is greater than that of the control composition. This therefore indicates that the use of these compositions is more difficult than use of the control composition. In other words, in order to achieve the desired viscosity for use of the compositions in question, it will be necessary to heat them to a temperature higher than the temperature necessary to achieve the same viscosity with the control composition.

This runs counter to the aims of energy saving, reduction in implementation temperatures, reduction in on-site fume emissions, and workers' protection.

BRIEF DESCRIPTION OF THE INVENTION

An aim of the invention is to propose a process for the preparation of a bitumen base which remedies the aforementioned drawbacks of a blown bitumen. In particular, an aim of the invention is to propose a process for the preparation of a bitumen base which has a low thermal susceptibility, even an improved thermal susceptibility compared with that of a blown bitumen according to the usual method. It involves in particular the obtaining of a bitumen base having a ring-and-ball softening point higher than that of a blown bitumen obtained from the same starting bitumen, and/or having a needle penetration lower than that of a blown bitumen obtained from the same starting bitumen. The concept of chemical blowing can thus be mentioned.

Another aim of the invention is to propose a process for the preparation of a bitumen base from a standard bitumen, without the prior need to modify the starting bitumen, for example using a flux, this process allowing a bitumen base to be obtained of the required grade (needle penetration) and ring-and-ball softening point.

A further aim of the invention is to propose a process for the preparation of a bitumen base having a grade and RBSP previously achieved mainly by addition of a polymer.

A complementary aim of the invention is to propose a process for the preparation of a bitumen base which makes it possible to obtain a bitumen which is more resistant to ageing than a customary blown bitumen.

A supplementary aim of the invention is to propose a process for the preparation of a bitumen base which makes it possible to obtain a less fragile bitumen than a customary blown bitumen.

Another aim of the invention is to propose a process for the preparation of a bitumen base which makes it possible to obtain a bitumen having a good adhesiveness to aggregate, comparable to the adhesiveness of an unblown bitumen.

A further aim of the invention is to propose a process for the preparation of a bitumen base which makes it possible to obtain a bitumen having a hot viscosity comparable with that of the starting bitumen.

A supplementary aim of the invention is to propose a process for the preparation of a bitumen base hardened at use temperatures and which retains a hot workability comparable with that of the starting bitumen.

Thus, the inventors' achievement is that they were able to show that the addition of certain organic additives to a bitumen allows the problems mentioned above to be solved and the aims of the invention to be met. Such organic additives make it possible to obtain, from a given starting bitumen, a bitumen base having the principal features of a blown bitumen (increase in the RBSP and reduction in the needle penetration compared with the starting bitumen), without the drawbacks of a blown bitumen. For example, a bitumen base obtained according to the invention has an improved resistance to ageing compared with a customary blown bitumen, and a brittleness under cold conditions and hot viscosity comparable with those of the starting bitumen.

DETAILED DESCRIPTION OF THE INVENTION

Figure 1:
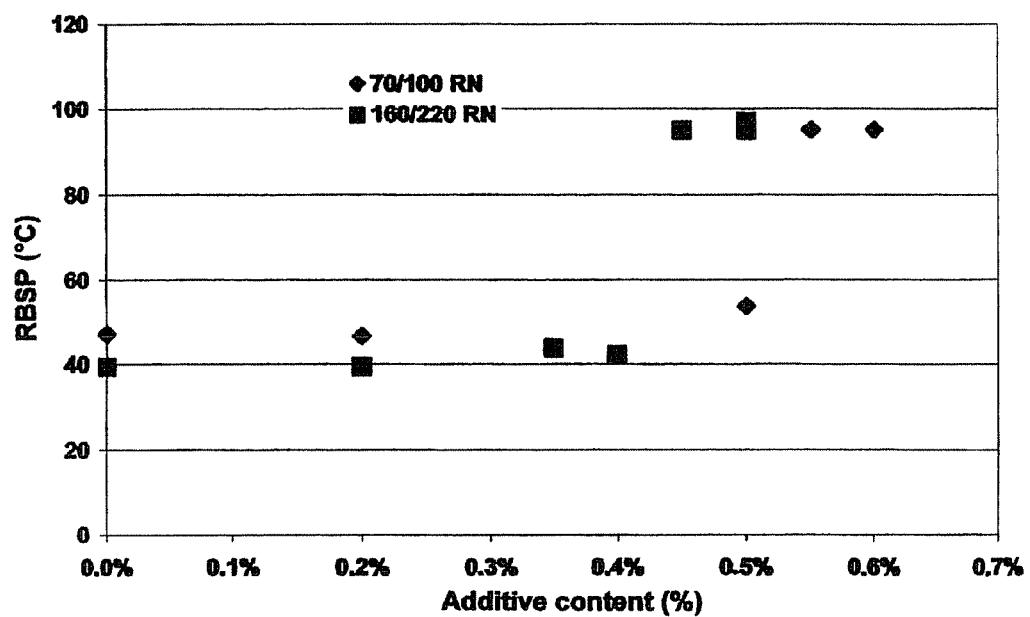
FIG. 1 shows the pattern of the ring-and-ball softening point (RBSP) in ° C., for two grades of bitumen, in relation to their chemical blowing additive content expressed as a % by weight relative to the weight of bitumen.

Three temperature ranges are defined:
manufacturing temperatures: temperatures to which the bitumen must be heated to prepare the bituminous composition, i.e. for example the mixing with various additives, with fillers, aggregate, optionally emulsification,
implementation temperatures: temperatures of application of the bituminous composition to a base, during the manufacture of a finished product (road layer, sealing film, etc.),
use temperatures: ambient temperatures to which the finished product may be exposed over time.

The inventors have developed a process which makes it possible to obtain a bitumen base hardened at the use temperatures, while still retaining manufacturing and implementation temperatures comparable with those of the starting bitumen. Thus, the bitumen base according to the invention retains a good workability at high temperatures. In contrast, the hot workability of a conventional blown bitumen is less than that of an unblown bitumen, in particular because of the increased viscosity in hot conditions.

Thus, a first subject of the invention is a process for the preparation of a bitumen base comprising the following essential stages:

a) a bitumen is introduced into a receptacle equipped with stirring means, and the bitumen raised to a temperature of 120° C. to 300° C., b) at least one chemical blowing additive is placed in the receptacle, and the whole is mixed, said chemical blowing additive having the following general formula:

Ar1-R—Ar2  (I)

where Ar1 and Ar2 represent independently of each other a benzene ring or a system of condensed aromatic rings having 6 to 20 carbon atoms, substituted by at least one hydroxyl group, and R represents an optionally substituted divalent radical, of which the principal chain comprises from 6 to 20 carbon atoms and at least one amide and/or ester group.

The invention also relates to a bitumen base which can be obtained by such a process.

More particularly, this is a bitumen base of which the needle penetration at 25° C. ($P_{25}$), measured according to standard NF EN 1426, is comprised between 20 and 300 tenths of a millimeter, and more particularly 50 to 300 tenths of a millimeter, and of which the ring-and-ball softening point (RBSP), measured according to standard NF EN 1427, is comprised between 70 and 120° C. Advantageously, such a bitumen base is prepared without the addition of polymer.

Moreover, the invention relates to the use of a bitumen base thus obtained in the preparation of a bituminous binder, in particular a bituminous emulsion, a fluxed bitumen or a polymeric bitumen.

The invention also relates to the use of a bitumen base obtained at the end of this process, on the one hand in the preparation of a combination of a bituminous binder and road aggregate, and on the other hand in industrial applications.

The invention also relates to combinations of a bituminous binder comprising a bitumen according to the invention and road aggregate, as such.

Finally, the invention relates to the use of a compound of general formula (I) as defined above, as a chemical blowing additive for preparing a bitumen base, in particular from a standard bitumen.

The term "blown bitumen" denotes a bituminous base obtained at the end of a customary blowing operation. The blowing is carried out by circulating air and/or oxygen through a starting bitumen. This leads to the dehydrogenation of the short residues present in the starting bitumen. Oxidation and polycondensation result, particularly starting from malthenes. Thus new asphaltenes are formed and the overall molecular size of the asphaltenes present in the starting bitumen increases.

As previously stated, a blown bitumen is harder than the starting bitumen from which it was made. Moreover, blown bitumens have a lower thermal susceptibility than that of the starting bitumen. In other words, their penetration index is higher than that of the starting bitumen. This is associated in particular with a higher RBSP and a lower needle penetration than that of the starting bitumen.

In the present application, by "blown type bitumen" is meant a bitumen base having features similar to those of a blown bitumen, in the sense that the RBSP and the needle penetration of a blown type bitumen are respectively higher and lower than that of the starting bitumen used during the manufacture of the blown type bitumen. However, such a bitumen base according to the invention is not obtained by a customary blowing process using air or oxygen.

Bitumen is a heavy product which can be obtained from various sources. Among the bitumen bases which can be used according to the invention are natural bitumens, or bitumens originating in a mineral oil. Bitumen bases are generally used as such (pure bitumens) alone and/or in mixtures of bases of different origins. The use of bitumen bases in liquefied, fluxed and/or oxidized form can also be envisaged, including conventionally blown, as well as mixtures of these different forms optionally with pure bitumens. Preferably, natural bitumens or bitumens originating in a mineral oil are used as such or in a mixture.

Pitches obtained by cracking or tars can be used as a bituminous base, as well as mixtures of bituminous components. There may be mentioned, as interesting examples of bituminous bases, direct-distillation bitumens, precipitation bitumens, deasphalting residue bitumens, visbreaking, synthetic bitumens, natural asphalts, alone or in a mixture, of which the needle penetration $P_{25}$ varies from 10 to 900 ¹/₁₀ mm, in particular from 20 to 280 ¹/₁₀ mm and more particularly from 50 to 250 ¹/₁₀ mm.

By "standard bitumen" is meant a bitumen of standard grade, as defined in European Standard EN 12591.

Throughout the present Application, the following properties of the bitumens are measured as shown in Table 1 below:

TABLE 1

| Property | Abbreviation | Unit | Measurement standard |
|---|---|---|---|
| Needle penetration at 25° C. | $P_{25}$ | 1/10 mm | NF EN 1426 |
| Ring and ball softening point | RBSP | ° C. | NF EN 1427 |
| Fraass breaking point | FBP | ° C. | EN 12593 |
| "Rolling Thin Film Oven Test" ageing test | RTFOT | — | EN 12607-1 |
| Brookfield viscosity | — | mPa · s | cf. examples |
| Passive adhesivity | — | % | EN 13614 |
| Complex module | G* | Pa | cf. examples |

Moreover, the PI penetration index (or Pfeiffer number) is defined by the following calculation formula:

$$PI = \frac{1952 - 500 \times \log(P_{25}) - 20 \times RBSP}{50 \times \log(P_{25}) - RBSP - 120}$$

In particular, the process according to the invention makes it possible to obtain a bitumen base that is able to be used in a similar fashion to a blown bitumen, in various highway and industrial applications.

Thus, for highway applications, asphalt mixes in particular are considered as materials for the construction and maintenance of road foundations and their coating, as well as for carrying out all road works. Thus, the invention relates for example to surface dressings, hot asphalt mixes, cold asphalt mixes, cold-cast asphalt mixes, gravel emulsions, base, binder, bonding and wearing courses, and other combinations of a bituminous binder and road aggregate having particular properties, such as anti-rutting courses, draining mixes, or asphalts (a mixture of a bituminous binder and a fine mineral filler such as sand).

Bituminous binders as such, used in particular in highway applications, are also considered. These binders include a bitumen base according to the invention. This is for example fluxed bitumen or bituminous emulsion.

Among the industrial applications of the bitumen bases according to the invention, mention can be made of the manufacture of sealing membranes, anti-noise membranes, insulating membranes, surface coatings, carpet tiles, impregnation layers, etc.

During the implementation of the preparation process according to the invention, various types of bitumen can be used. By definition according to the invention, an unmodified bitumen is used as starting bitumen, i.e. a bitumen which does not contain polymer.

The addition of a chemical blowing additive to the bitumen or the mixture of bitumens, raised to a high temperature, makes it possible to obtain a bitumen base according to the invention. As will be illustrated by the examples, the chemical blowing additive acts rapidly inside the bituminous mass, at a low content, a low temperature, and without harmful emissions.

More precisely, the chemical blowing additive is an organic compound of general formula (I):

Ar1-R—Ar2          (I)

where Ar1 and Ar2 represent independently of each other a benzene ring or a system of condensed aromatic rings having 6 to 20 carbon atoms, substituted by at least one hydroxyl group, and R represents an optionally substituted divalent radical, of which the principal chain comprises from 6 to 20 carbon atoms and at least one amide and/or ester group.

Preferably, Ar1 and Ar2 are a benzene ring or a system of condensed aromatic rings of 6 to 10 carbon atoms. Preferably, this is a benzene ring. The benzene ring or the system of condensed aromatic rings is substituted by at least one hydroxyl group, even several hydroxyl groups.

Preferably, —R— is in para position relative to a hydroxyl group of Ar1 and/or of Ar2. Moreover, Ar1 and/or Ar2 can be substituted by one or more alkyl groups comprising from 1 to 10 carbon atoms, preferably in one or more ortho positions relative to the Ar1 and/or Ar2 hydroxyl group(s).

Preferably, Ar1 and Ar2 are 3,5-dialkyl-4-hydroxyphenyl groups and even better, 3,5-di-tert-butyl-4-hydroxyphenyl groups.

Preferably, their divalent radical —R— has the following general formula (II):

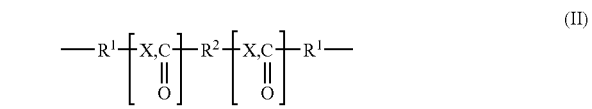

where
R$^1$ represents a C$_1$-C$_4$ alkylene group;
R$^2$ represents a single bond or an optionally substituted alkylene group of which the principal chain comprises from 1 to 10 carbon atoms,

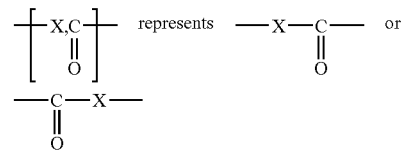

and X represents a divalent NH group or an oxygen atom.

Preferably, the R$^1$ group is an ethylene group and independently, the R$^2$ group is a covalent simple bond or an n-hexylene group. When R$^2$ is substituted, this can be by one or more substituents such as the alkaryl or aralkyl groups, carrying a group of type Ar1 and/or Ar2.

Preferably, the chemical blowing additive is 2',3-bis[[3-[3,5-di-tert-butyl-4-hydroxyphenyl]propionyl]]propionohydrazide.

The blowing additive preferably represents from 0.1 to 5.0% by weight relative to the weight of the bitumen. According to an increasing order of preference, the blowing additive represents at least 0.1%, 0.4%, 0.5% or 0.8% by weight relative to the weight of bitumen, and independently, according to an increasing order of preference, at most 5.0%, 2.0% or 1.0% by weight relative to the weight of bitumen. A quantity below 0.1% by weight of additive could be insufficient to obtain a bitumen base according to the invention, while a quantity above 5.0% by weight of additive is not necessary, as the additive is active in a low dose. According to a preferred implementation, the chemical blowing additive represents from 0.4% to 1.5% by weight in relation to the weight of the bitumen, and even better, from 0.5 to 1.0% by weight in relation to the weight of the bitumen.

During the preparation process according to the invention, the bitumen is raised to a temperature comprised between 120° C. to 300° C. and is kept at a temperature comprised within this range. In many cases, as will be illustrated by the examples, a temperature comprised between 150° C. and 180° C. is sufficient to obtain a bitumen base. From the point of view of the process, an advantage of the invention, compared with the normal blowing process, is that it is not essential to control the temperature. In fact, during a normal blowing process, the oxidation reactions which result are exothermic. This can therefore lead to an overheating, detrimental to the efficiency of the blowing unit or to the quality of the blown bitumen. The process according to the invention does not have this drawback.

The chemical blowing additive is introduced preferably in powder form into the bitumen or heated bitumen mixture.

Moreover, the mixing time is reduced: mixing of the bitumen and the chemical blowing additive is carried out for at least a few minutes, for example 5 to 10 minutes and preferably at least 15 minutes, according to the volume of bitumen treated. Generally, the mixing can be carried out in less than one hour, even less than 45 minutes or even 30 minutes, according to the volume of bitumen treated.

The mixing conditions, in particular the stirring conditions, have little influence on the satisfactory course of the process. The mixture can be made using an anchor stirrer, a screw mixer, a centripetal screw mixer, a high-shear mixer, etc.

At the end of the process, a bitumen base is obtained that has certain characteristics of a blown bitumen. In particular, it is hardened compared with the starting bitumen. Also, the needle penetration $P_{25}$ decreases compared with the starting bitumen and the RBSP increases with respect to that of the starting bitumen. On the other hand, contrary to the case of a blown bitumen, the low-temperature properties of the bitumen base, such as the Fraass point, do not deteriorate. Also, bitumens of blown type have a better ageing behaviour, as will be illustrated in the examples by means of the RTFOT test. Moreover, the chemical blowing additive does not affect the viscosity of the bitumen base compared with that of the starting bitumen, at the implementation temperatures (i.e. the temperatures of use, for example on a roadway site).

Thus, the invention also relates to a bitumen base obtained at the end of a process such as described above, having the following characteristics:

- needle penetration at 25° C. ($P_{25}$), measured according to the standard NF EN 1426, comprised between 20 and 300 tenths of a millimeter, preferably between 50 and 300 tenths of a millimeter,
- ring-and-ball softening point (RBSP): measured according to standard NF EN 1427, comprised between 70 and 120° C.,
- prepared without the addition of a polymer.

The process according to the invention makes it possible to obtain the above mentioned grades of bitumen, which previously required the use of polymers.

In other words, the invention relates to a bitumen base comprising an unmodified bitumen and at least a chemical blowing additive having the following general formula:

$$\text{Ar1-R-Ar2} \quad (I)$$

where Ar1 and Ar2 represent independently of each other a benzene ring or a system of condensed aromatic rings having 6 to 20 carbon atoms, substituted by at least one hydroxyl group, and R represents an optionally substituted divalent radical, of which the principal chain comprises from 6 to 20 carbon atoms and at least one amide and/or ester group.

The chemical blowing additive is defined more precisely in the description above. Such a bitumen base is prepared from an unmodified bitumen base, i.e. one that does not contain polymer.

As will be seen in the examples, it is particularly useful to obtain a hardened bitumen base whose implementation qualities are not affected by the hardening to the use temperatures. In fact, hardening a bitumen generally degrades the hot workability of said bitumen, i.e. in particular that its hot viscosity increases. The bitumen bases obtained in accordance with the invention are hardened, as evidenced by a reduction in penetration at 25° C., but their viscosity at 160° C. is comparable to that of the starting bitumen. This means there is no need to "overheat" the bitumen base in order to achieve a viscosity low enough for implementation.

This is useful both for hot applications and for cold applications. For example, for the emulsification of a bitumen base obtained in accordance with the invention, there will be no need to "overheat" the bitumen base during production and implementation of the bituminous composition comprising such a bitumen base, despite the fact that it is hardened at the use temperatures.

An additional advantage of the invention rests in the possibility of using a soft grade of bitumen for applications which currently require a harder grade of bitumen. In fact, the bitumen base obtained at the end of the process according to the invention will be hardened. It will therefore be able to meet the specifications relating to use temperatures. Also, the use of a soft bitumen will allow a production and an implementation at lower temperatures than those which were previously necessary, because of the use of a harder bitumen.

The bitumen base according to the invention can be used in the same way as a normal blown bitumen, in road and/or industrial applications. Thus, it can be used to prepare a bituminous binder such as a bituminous emulsion, a fluxed bitumen, or a polymeric bitumen.

Fluxed bitumens are compositions of bitumen(s) obtained from pure bitumens whose viscosity has been lowered by adding volatile solvents. The most viscous categories of fluxed bitumens are generally reserved for surface dressings, while the most fluid are generally used for impregnation, soil stabilisation, the production of emulsions and the preparation of storable cold-cast mixes.

Liquefied bitumens are obtained by mixing bituminous binders with carbochemical or petroleum oils. Fluxed bitumens differ from liquefied bitumens, in particular in respect of the distillation curve of their fluxes, substantially extended upwards.

Bitumen emulsions are another form of application of bitumens giving access to fluid liquid forms that can be handled at low temperatures (i.e. for example at a temperature of the order of 60 to 80° C.). These emulsions are obtained by dispersing the bitumen in globules measuring a few microns in diameter, in an aqueous phase to which emulsifiers have been added. The emulsions include anionic emulsions (the first known) as well as cationic emulsions which currently represent the majority of products. In each of these categories, the emulsions are distinguished by the bituminous binder content, the rupture speed and the viscosity.

According to the terminology adopted within the framework of the present disclosure, the liquefied bituminous binders and the fluxed bituminous binders are included in the same category, the terms "fluxed" and "liquefied" being thus considered synonymous.

Fluxed bitumens are traditionally obtained by mixing, for example at 150° C., on the one hand, bituminous binder and on the other hand, flux. Petroleum- and plant-based fluxes are generally known.

It is also possible to add a polymer to the bitumen base obtained at the end of the process according to the invention. This is not incompatible with the feature according to which the bitumen base is prepared without adding polymer. In fact, the needle penetration and RBSP characteristics mentioned are those of the bitumen base obtained at the end of the process, before the addition of any polymer.

By way of examples of polymers for bitumen, there can be mentioned elastomers such as the copolymers SB, SBS, SIS, SBS*, SBR, EPDM, polychloroprene, polynorbomene and optionally polyolefins such as the polyethylenes PE, PEHD, polypropylene PP, plastomers such as EVA, EMA, copolymers of olefins and EBA unsaturated carboxylic esters EBA, elastomeric polyolefins copolymers, polyolefins of the polybutene type, copolymers of ethylene and acrylic acid, methacrylic or maleic anhydride esters, copolymers and terpolymers of ethylene and of glycydil methacrylate, ethylene-propylene copolymers, rubbers, polyisobutylenes, SEBS, ABS.

SB styrene-butadiene block copolymer
SBS styrene-butadiene-styrene block copolymer
SBS* stellar styrene-butadiene-styrene block copolymer
EVA ethylene vinyl acetate copolymer
EBA ethylene butyl acrylate copolymer
PE polyethylene
EPDM ethylene propylene diene monomer
SIS styrene-isoprene-styrene
EMA ethylene methyl acrylate copolymer
SEBS styrene-ethylene-butylene-styrene copolymer
ABS acrylonitrile-butadiene-styrene
PEHD high-density polyethylene
SBR styrene-butadiene rubber Other agents can be added to the bitumen base according to the invention. These are for example vulcanization agents and/or cross-linking agents capable of reacting with a polymer, when an elastomer and/or a functionalized plastomer is involved.

Among vulcanisation agents there can be mentioned those which are based on sulphur and its derivatives, used to cross-link an elastomer at the rate of 0.01% to 30% relative to the weight of elastomer. Preferably, when a polymer is used in the bitumen base, at least one sulphur-based vulcanisation agent or its derivatives is also used.

Among the cross-linking agents there can be mentioned cationic cross-linking agents such as mono- or polyacids, or carboxylic anhydrides, esters of carboxylic acids, sulphonic, sulphuric, phosphoric acids, even acid chlorides, phenols, at rates of 0.01% to 30% relative to the polymer. These agents are capable of reacting with the elastomer and/or the functionalized plastomer. They can be used to complement or replace vulcanization agents.

We mention among these cationic cross-linking agents, by way of non-limiting examples carboxylic acids such as 4,4'dicarboxydiphenylether, sebacic acids,
anhydrides such as phthalic, oxydiphthalic, trimellitic, terephthalic
acid butyl esters of phthalic or oxydiphthalic anhydrides,
sulphonic acids such as para-toluene sulphonic acids, sulphonic or disulphonic naphthalene, sulphonic methane, 1 hexane sulphonic,
phosphonic acids such as benzene phosphonic, tert-butyl phosphonic acids,
phosphoric acids such as phosphoric, polyphosphoric and alkylphosphoric acids such as dodecylphosphoric or also diethylphosphoric or also glycerophosphoric acid, or even arylphosphoric acids such as phenylphosphoric acid.

EXAMPLES

The invention is illustrated by the following non-limitative examples. The rheological and mechanical characteristics of the bitumens or of the bitumen-additive compositions to which reference is made in these examples are measured as indicated in Table 1.

Also, the Brookfield viscosity is expressed in mPa·s. Viscosity is measured using a Brookfield CAP 2000+ viscometer. It is measured at 160° C. and at different speeds of rotation (100 rpm, 500 rpm, 750 rpm and 1000 rpm). The measurement is read after 30 seconds for each speed of rotation.

The complex module is measured using a Rheometric Scientific RDA2 rheometer. It is measured at 10° C. and 60° C. and at the frequency of 7.8 Hz.

The products used in these examples are:
Bitumens: bitumens marketed by Total France.
Chemical blowing additive: phenolic compounds comprising hydrazide functions. In particular, 2',3-bis[[3-[3,5-di-tert-butyl-4-hydroxyphenyl]propionyl]]propionohydrazide is used. It is called additive A.

Example 1

Preparation of a Bitumen+Additive A Composition from Bitumens of Different Origins This first example relates to bitumen+additive A compositions according to the invention. Five bitumens of different origins were used in this example. Their respective characteristics are given in Table 2 below.

The preparations are produced at 170° C., in a reactor accompanied by stirring. 99% by weight of a bitumen is introduced into the reactor. Then 1% by weight of additive A is added whose melting point is comprised between 221 and 232° C. The mixtures are stirred for approximately 15 minutes. Their final appearance is homogeneous.

TABLE 2

|  | Bitumen A Central America | Bitumen B Middle East | Bitumen C CEI | Bitumen D Middle East | Bitumen E Middle East |
|---|---|---|---|---|---|
|  | Before addition of additive | | | | |
| $P_{25}$ (1/10 mm) | 200 | 153 | 187 | 55 | 169 |
| RBSP | 40 | 40.6 | 40.7 | 50 | 39.8 |
|  | Addition of 1% of additive A | | | | |
| $P_{25}$ (1/10 mm) | 40 | 54 | 71 | 28 | 57 |
| RBSP | 98 | 100 | >100 | 110 | 111.8 |

As the results of this example show, irrespective of the origin of the starting bitumen, the action of the additive is the same. It is characterized by a reduction in the penetration $P_{25}$ and an increase in the RBSP. This action is similar to that which can be observed with normal blowing of a bitumen.

Figure 2:
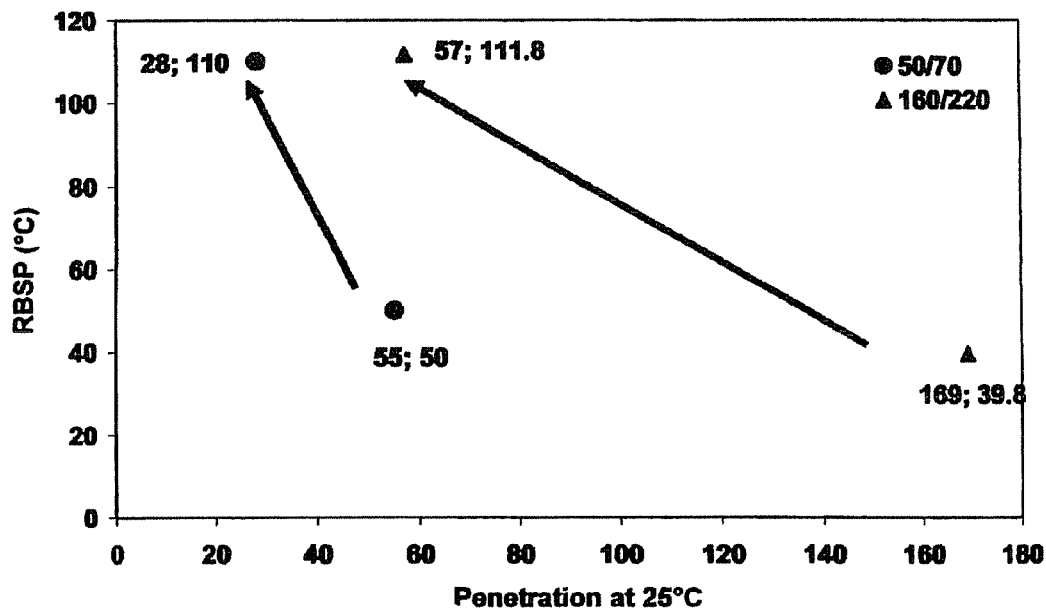
FIG. 2 shows the pattern of the two principal features of a bitumen, the ring-and-ball softening point (RBSP) in ° C. and the penetration at 25° C., for two grades of bitumen, after the addition of 1% by weight of chemical blowing additive.

These results are illustrated in FIGS. 1 and 2. FIG. 1 shows that, from a certain additive content, the RBSP is practically doubled, for two grades of bitumen (diamonds: grade 70/100 RN; squares: grade 160/220 RN). FIG. 2 shows that the RBSP and the penetration at 25° C. of two different grades of bitumen (circles: grade 50/70; triangles: grade 160/220) are modified. The RBSP has practically doubled, even tripled, while the penetration at 25° C. decreases. Therefore in the two cases the result is a hardened bitumen compared with the starting bitumen. Also, it would appear that the hardening effect is greater for a soft bitumen.

Example 2

Preparation of a Bitumen+Additive A Composition

This example relates to the bitumen+additive A compositions according to the invention. It illustrates the rapidity of action of the additive and its beneficial effect on the viscosity at 160° C. and the Fraass breaking point.

This preparation is produced at 160° C., in a reactor, accompanied by stirring. 99.1% by weight of a bitumen C having a penetration at 25° C. of 187 $^{1}/_{10}$ mm and a ring-and-ball softening point of 40.7° C. is introduced into the reactor. Then 0.9% by weight of additive A is added, whose melting point is comprised between 221 and 232° C. The mixture is stirred for 20 minutes, 40 minutes or 1 hour. The mixture obtained has a homogeneous appearance. It is generally considered that a variation in viscosity of less than 10% is not significant.

The characteristics are measured after the different stirring times and listed in Table 3 below.

TABLE 3

|  |  | Bitumen C + 0.9% additive | | |
| --- | --- | --- | --- | --- |
| Temperature | | 160° C. | 160° C. | 160° C. |
| Stirring time | Bitumen C | 20 min | 40 min | 1 hour |
| $P_{25}$ ($^{1}/_{10}$ mm) | 187 | 71 | 70 | 70 |
| RBSP (° C.) | 40.7 | >100 | 106 | 106 |
| PI | −0.04 | | 8.15 | 8.15 |
| FBP (° C.) | −10 | −10 | −17 | −17 |
| Brookfield viscosity at 160° C. (mPa · s) | | | | |
| 500 rpm | 75.4 | | | 76.6 |
| 750 rpm | 73.3 | 73.2 | 73.5 | 75 |
| 1000 rpm | 71.4 | | 73.5 | |

This example clearly shows that the viscosity at 160° C. and the Fraass breaking point are unchanged between the starting bitumen and the bitumen base obtained after addition of additives, irrespective of the duration of the mixing. Thus, the hot workability of the bitumen base obtained after addition of additives is comparable to that of the starting bitumen.

Example 3

Preparation of a Bitumen+Additive A Composition

This example relates to the bitumen compositions+additive A according to the invention. It illustrates the influence of the grade of the starting bitumen and the effect of an ageing simulated by a RTFOT test.

The preparations are produced at 170° C., in a reactor accompanied by stirring. 99% by weight of a bitumen is introduced into the reactor. Then 1% by weight of additive A whose melting point is between 221 and 232° C. is added. The mixtures are stirred for approximately 15 minutes. Their final appearance is homogeneous. Their properties are listed in table 4. In particular the passive adhesivity of the bitumen base compared with different types of aggregate is evaluated.

TABLE 4

|  | Bitumen D | Bitumen D + 1% additive | Bitumen E | Bitumen E + 1% additive |
| --- | --- | --- | --- | --- |
| $P_{25}$ ($^{1}/_{10}$ mm) | 55 | 28 | 169 | 57 |
| RBSP | 50 | 110 | 39.8 | 111.8 |
| PI | −0.99 | 6.16 | −0.87 | 8.07 |
| FBP (° C.) | | −11 | | −15 |
| Brookfield viscosity (mPa · s) (1) | | | | |
| | 203 | 188 | 135 | 128 |
| Complex module G* (Pa) (2) | | | | |
| 10° C. | $1.9 \times 10^7$ | $3.2 \times 10^7$ | $4.1 \times 10^6$ | $1.5 \times 10^7$ |
| 60° C. | $1.0 \times 10^4$ | $1.8 \times 10^5$ | $2.6 \times 10^3$ | $1.4 \times 10^5$ |
| Passive adhesivity (%) | | | | |
| Diorite | | 100 | | 100 |
| Quartzite | | 100 | | 100 |
| Limestone | | 100 | | 100 |
| Silex | | 100 | | 100 |
| After RTFOT ageing | | | | |
| $Pa_{25}$ ($^{1}/_{10}$ mm) | | 102 | | 47 |
| $PR_{25}$ (%) (3) | | 60.3 | | 82.4 |
| RBSP (° C.) | | 44.4 | | 106.8 |
| Δ RBSP (° C.) (4) | | 4.6 | | −5 |
| PI | | 0.9 | | 7.1 |

(1) Brookfield viscosity at 160° C. and 100 rpm (mPa · s)
(2) Complex module G* measured at 7.8 Hz (Pa)
(3) Residual penetration $PR_{25} = P_{25}$ after RTFOT/$P_{25}$ before RFTOT × 100 expressed in %
(4) Variation in ring-and ball-softening point expressed in ° C., Δ RBSP = RBSP after RTFOT − RBSP before RTFOT With the two bitumens D and E, a reduction in the penetration and an increase in the RBSP associated with the addition of additives are observed. Moreover, this example shows that the complex module of the bitumen increases when it is added to.

The ageing of the bitumen is simulated by the standardized RTFOT test. Generally, while ageing a bitumen hardens: its needle penetration decreases while its ring-and-ball softening point increases.

The residual penetration, expressed as a percentage, is the ratio of the needle penetration at 25° C. ($P_{25}$) after ageing simulated by the RTFOT test to the $P_{25}$ before the RTFOT test. The greater it is, the better is the resistance of the bitumen to ageing. Moreover, the smaller the variation in the softening point, the better the resistance of the bitumen to ageing.

The RTFOT test shows that the penetration decreases less in the added-to bitumen base than in the starting bitumen, after simulated ageing. Moreover, even after simulated ageing, the Pfeiffer penetration index of the added-to bitumen base remains high. The residual penetration of the added-to bitumen is greater than that of the starting bitumen. Moreover, the variation in the RBSP is negative for the added-to bitumen. The added-to bitumen base is therefore less susceptible to ageing than the starting bitumen.

The added-to bitumen bases present a good passive adhesivity: no stripping of the aggregate is observed at the end of the adhesivity test.

Given the properties of the added-to bitumen base, these constitute suitable binders for anti-rutting applications in particular.

The invention claimed is:
1. Process for the preparation of a "blown type" bitumen base comprising the following essential stages:

a) a bitumen is introduced into a receptacle equipped with stirring means, and the bitumen is raised to a temperature of 120° C. to 300° C.,
b) at least one chemical blowing additive is introduced into the receptacle, and mixing is carried out, said chemical blowing additive having the following general formula:

Ar1-R—Ar2  (I)

where Ar1 and Ar2 represent independently of each other a benzene ring or a system of condensed aromatic rings of 6 to 20 carbon atoms, substituted by at least one hydroxyl group, and R represents an optionally substituted divalent radical, of which the principal chain comprises from 6 to 20 carbon atoms and at least one amide and/or ester group, wherein the chemical blowing additive is from 0.4% to 5.0% by weight relative to the weight of bitumen.

2. Process according to claim 1, in which Ar1 and/or Ar2 are substituted by at least one $C_1$-$C_{10}$ alkyl group.

3. Process according to either claim 1 or claim 2, in which —R— is in para position relative to a hydroxyl group of Ar1 and/or of Ar2.

4. Process according to claim 1, in which Ar1 and Ar2 are 3,5-dialkyl-4-hydroxyphenyl groups.

5. Process according to claim 1, in which the additive is 2',3-bis[[3-[3,5-di-tert -butyl-4-hydroxyphenyl]propionyl]] propionohydrazide.

6. Process according to claim 1, wherein the mixing is carried out for a time period of 5 minutes to 1 hour.

7. A "blown type" bitumen base comprising an unmodified bitumen and at least a chemical blowing additive having the following general formula:

Ar1-R—Ar2  (I)

where Ar1 and Ar2 represent independently of each other a benzene ring or a system of condensed aromatic rings of 6 to 20 carbon atoms, substituted by at least one hydroxyl group, and R represents an optionally substituted divalent radical, of which the principal chain comprises from 6 to 20 carbon atoms and at least one amide and/or ester group, in which the "blown type bitumen" base is prepared without the addition of a polymer.

8. A "blown type" bitumen base according to claim 7 having a needle penetration at 25° C. ($P_{25}$) value and ring and ball softening point (RBSP) value, and a viscosity at 160° C.; wherein
the needle penetration at 25° C. ($P_{25}$), measured according to the standard ASTM D5, is comprised between 20 and 300 tenths of millimeters, and where the ring and ball softening point (RBSP), measured according to standard ASTM D36/D36M, is comprised between 70 and 120° C., and
the viscosity at 160° C. is comparable to that of the starting bitumen;
the chemical blowing additive is from 0.4% to 5.0% by weight relative to the weight of bitumen.

9. A method of preparing a combination of a bituminous binder and road aggregates comprising contacting a bitumen base according to either claim 7 or claim 8 and road aggregates.

10. A method of preparing a sealing membrane, membrane or impregnation layer comprising contacting the bitumen of either claim 7 or claim 8 to a base.

11. A composition comprising a bitumen base according to either claim 7 or claim 8 and road aggregate.

12. A process according to claim 9, wherein the combination of a bituminous binder and road aggregates is selected from the group consisting of surface dressing, hot asphalt mix, cold asphalt mix, cold-cast asphalt mix, gravel emulsion, and wearing course.

13. A process according to claim 11, wherein the road aggregate is selected from the group consisting of surface dressing, hot asphalt mix, cold asphalt mix, cold-cast asphalt mix, gravel emulsion, and wearing course.

14. A process according to claim 1, in which the "blown type bitumen" base is prepared without the addition of a polymer.

* * * * *